Patented July 3, 1934

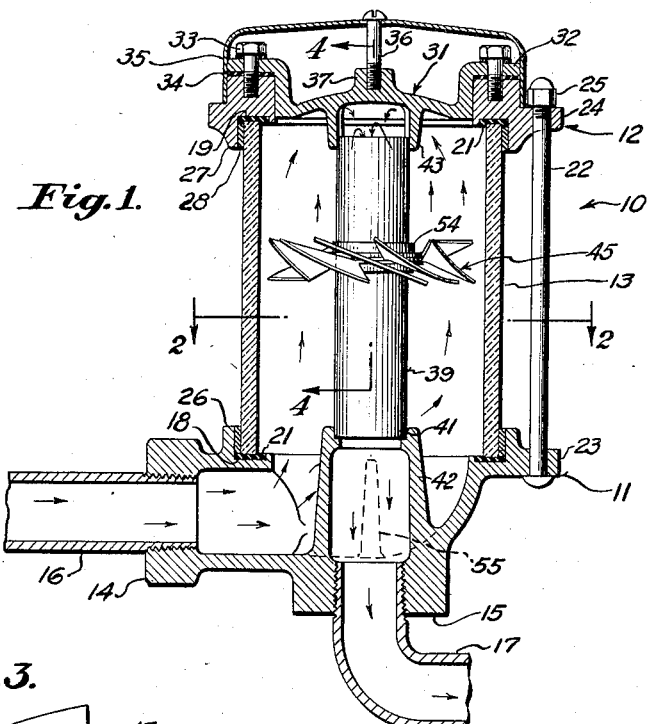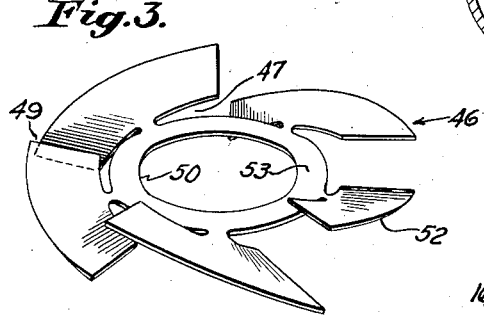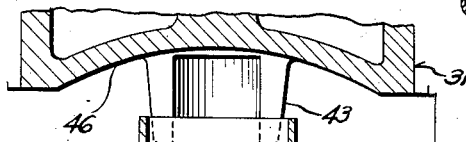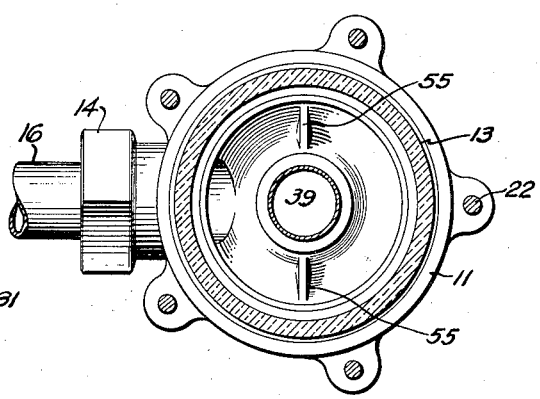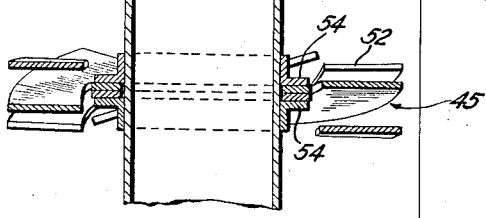

1,964,784

UNITED STATES PATENT OFFICE 1,964,784

LIQUID FLOW INDICATOR

David J. Nelson, Hamburg, and Henry Y. Henning, Kenmore, N. Y., assignors to Martin & Schwartz, Inc., Buffalo, N. Y., a corporation of New York Application October 6, 1932, Serial No. 636,484

2 Claims. (Cl. 116—117)

This invention relates to improvements in liquid flow indicating devices.

The invention concerns a device adapted to be interposed in a liquid circuit and containing an element which is rotatable by the moving liquid and visible through a transparent portion of a housing. More specifically, the invention is directed to a particular type of rotatable member which is devised to operate in coaxial relation to the liquid stream. The housing for this member is specially formed so that its removal may be accomplished without disturbing or dismantling the housing.

The entire device is constructed with a view to ease of assembly with a liquid circuit, wherein it is capable of visibly registering the movement of the liquid stream with a minimum of frictional resistance. These and other features of the invention are more fully set forth in the accompanying specification and drawing, wherein:

Fig. 1 is a vertical section through the indicating device.

Fig. 2 is a cross section on the line 2—2 of Fig. 1.

Fig. 3 is a perspective view showing one portion of the two piece rotor.

Fig. 4 is a partial section on the line 4—4 of Fig. 1.

The indicating device consists of a fabricated housing 10 having a lower head 11, an upper head 12 and a cylindrical sight glass 13 interposed therebetween. The lower head 11 contains both the inlet and outlet spuds 14 and 15 which are connected respectively to an inlet conduit 16 leading from a meter or other source and an outlet conduit 17 leading to a dispensing hose or similar destination.

Means are provided for obtaining a fluid tight connection between the component parts of the housing wherein the heads 11 and 12 are formed with opposed grooved faces 18 and 19 respectively, which contain gaskets 21, between which the glass 13 is received. The heads are clamped to the glass by tie bolts 22 which extend through lugs 23 in the lower head 11 and through similar lugs 24 in the upper head 12 for reception of clamping nuts 25.

The glass 13 is retained in concentric relation to the heads by annular flanges 26 and 27 extending from the faces 18 and 19 respectively. A felt gasket 28 is interposed between the flanges and the glass to protect the same from direct contact with the metal.

The upper head 12 is provided with a removable central portion 31 formed with an annular flange 32, which is secured by screws 33. A gasket 34 is interposed between the flange 32 and the head 12 to provide a fluid seal. The heads of the screws 33 are concealed by a cap member 35 which is fitted over the flange 32 and the head 12 and retained in position by a screw 36 which extends through the cap into a tapped hole in a boss 37 formed in the portion 31.

The liquid entering the housing 10 through the spud 14 is withdrawn at a point adjacent the top of the housing by means of an axial standpipe 39 which communicates with the output spud 15 and forms an extension thereof. The lower end of this pipe is mounted on a seat 41 formed in a raised extension 42 of the spud 15 of the lower head, while its upper end is retained against misalignment by segmental lugs 43 which depend from the portion 31 of the upper head 12 and engage opposed exterior portions of the pipe (Figs. 1 and 4).

The pipe 39 is utilized to provide a mounting for the indicating rotor 45 of the device. This rotor is formed in two parts, each of which consists of a circular sheet metal disc 46 (Fig. 3) formed with a plurality of spaced arcuate slots 47 intersected by radial slits 49. The circular segments thus formed are bent to form angular blades 52, while the central portion of the disc forms a planar hub 53 which contains a central orifice 50 adapted to receive the pipe 39.

The discs 46 thus formed are arranged in superimposed relation with the blades 52 spaced equally, whereupon the hubs 53 are integrated by welding to form a multi-blade rotor.

The rotor 45 is mounted for rotating movement on the pipe 39 and it is retained against axial movement by thrust collars 54 which are secured to the pipe 39 on opposite sides of the hubs 53. It will be observed that the rotor is suitably proportioned so that, together with the tube 39, it can be withdrawn from the housing through the upper head 12 upon removal of the portion 31. This permits easy access to the interior of the housing for cleaning or for removal and repair of the rotor.

The lower head 11 is formed with a pair of baffle ribs 55 arranged in the path of the incoming liquid (Figs. 1 and 2). These ribs serve to interrupt the centrifugal tendency of the liquid stream during transit around the right angle bend in the housing, and insure an equalized flow through the glass with the resulting uniform impingement of the stream on the blades of the rotor 45.

It is also to be noted that the central portion 31 of the upper head 12 is formed with a domed portion 46 to direct the liquid to the entrance of the pipe 39. This portion cooperates with the pipe 39 to form an area of reduced proportions through which the liquid is directed centrally at an increased velocity. Thus, small air volumes in the liquid pass through the device with equal facility as the liquid, since, due to location of the pipe entrance and to the described proportions of the upper head 12, the air cannot accumulate and form a pocket in any portion of the housing.

In operation, the rotor 45 has been found to be responsive to the slowest rates of flow obtainable in the described type of dispensing equipment. This result is chiefly due to the low weight resulting from the sheet metal structure together with the low pitch and close spacing of the blades 52. It might also be noted that the symmetrical interposition of the rotor in the liquid stream results in the reception of a uniform upward thrust thereon which counteracts the load of the rotor on the lower bearing collar and in effect eliminates thrust friction at normal rates of flow.

It will be obvious that the described association of the indicator with gasoline dispensing equipment is exemplary for purposes of description, and the use thereof in other environments is contemplated.

We claim:

1. A liquid flow indicator comprising a cylindrical housing having a transparent portion, a liquid input conduit leading into one end of the housing, an outlet conduit extending axially into said housing and terminating in spaced relation to the opposite end thereof, and a rotor having a hub portion rotatably mounted about said output conduit, and a plurality of radiating angular blades extending to the transparent portion of the housing.

2. In a liquid flow indicator, a housing having input and output conduits positioned to direct a liquid stream through the housing, a rotor interposed in the liquid stream, and means in the housing for mounting the rotor for rotating movement, said rotor being formed of a pair of superimposed and connected discs having blades formed in their marginal portions, the blades in one disc being spaced radially from the blades of the remaining disc.

DAVID J. NELSON.
HENRY Y. HENNING.